Figure 1:
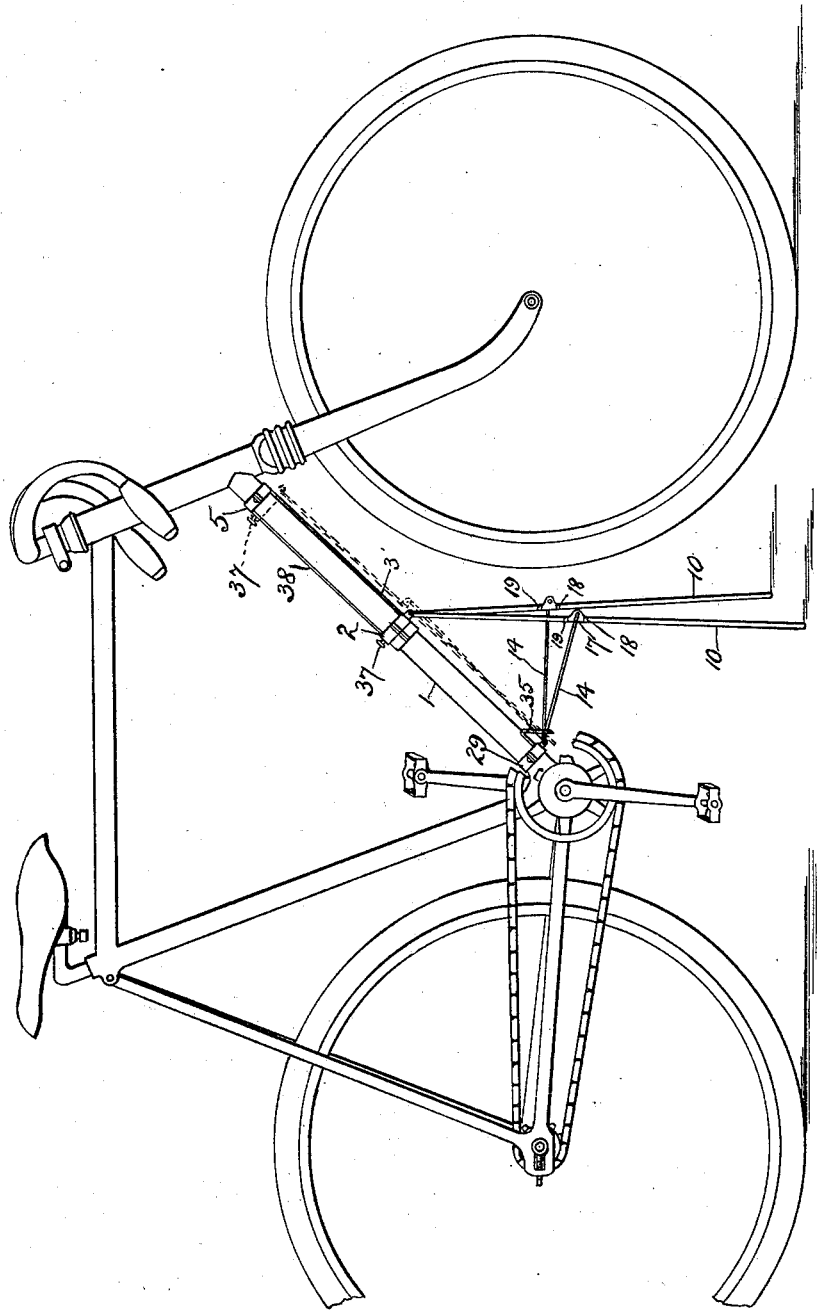

No. 609,869. Patented Aug. 30, 1898.
S. S. BEEBE.
BICYCLE SUPPORT.
(Application filed Apr. 4, 1896.)
(No Model.) 2 Sheets—Sheet 1.

Witnesses

Inventor
S. S. Beebe
by Elliott & Hopkins
Attys.

No. 609,869. Patented Aug. 30, 1898.
S. S. BEEBE.
BICYCLE SUPPORT.
(Application filed Apr. 4, 1896.)
(No Model.) 2 Sheets—Sheet 2.
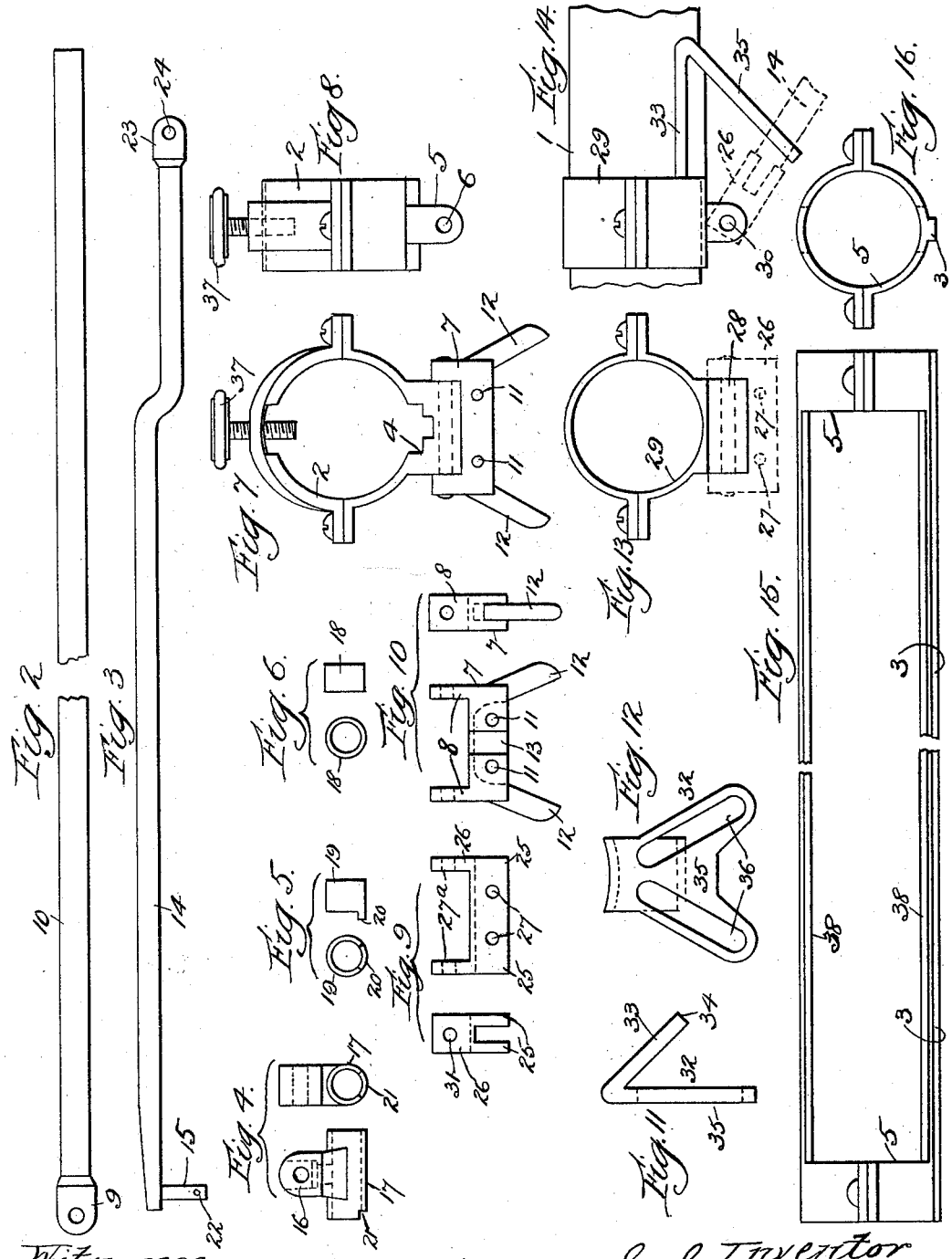

UNITED STATES PATENT OFFICE.

SAMUEL S. BEEBE, OF WISNER, NEBRASKA.

BICYCLE-SUPPORT.

SPECIFICATION forming part of Letters Patent No. 609,869, dated August 30, 1898.

Application filed April 4, 1896. Serial No. 586,256. (No model.)

*To all whom it may concern:*

Be it known that I, SAMUEL S. BEEBE, a citizen of the United States, residing at Wisner, in the county of Cuming and State of Nebraska, have invented certain new and useful Improvements in Supports for Velocipedes or Bicycles, of which the following is a full, clear, and exact specification.

My invention relates to that class of supports for bicycles or velocipedes which are designed to be attached to the machine and hold it in an upright position while not in use; and it has for its object to provide a simple and efficient support that may be permanently attached to some part of the machine and readily adjusted to its operative or supporting position and as readily folded up in compact form and out of the way when not in use.

Another object of my invention is to provide a bicycle or velocipede support with two legs which may be readily attached to the frame or some other convenient part of the machine and which by the movement in one direction of a suitable collar or other adjusting device will be caused to automatically spread apart and rest upon the ground and by the movement of such collar or adjusting device in the opposite direction will be caused to automatically fold up in a compact form and lie against or parallel with the part of the frame to which they are attached.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a side elevation of a bicycle provided with my improved support, the support being shown in its operative or supporting position in full lines and in its inactive or folded-up position in dotted lines. Fig. 2 is an enlarged detail view of one of the supporting-legs. Fig. 3 is an enlarged detail view of one of the bracing and spreading arms hereinafter described. Fig. 4 represents in detail and on an enlarged scale, respectively, a side elevation and end view of the universal joint by which the spreading and bracing arms are attached to the supporting-legs. Fig. 5 comprises an end view and side elevation of a collar for limiting the rotation of said universal joint and also preventing its upward endwise movement on the supporting-leg. Fig. 6 comprises an end view and side elevation of the collar for preventing the downward movement of said universal joint on the supporting-leg. Fig. 7 is an end elevation of the sliding collar for adjusting the supporting-legs. Fig. 8 is a side elevation of the same. Fig. 9 is respectively an end view and side elevation of the casting by which the spreading and bracing arms are pivotally connected to the frame of the machine. Fig. 10 is a side elevation and end view of the casting by which the supporting-legs are pivotally connected to the frame of the machine. Fig. 11 is a side elevation of the device for automatically spreading the bracing-arms. Fig. 12 is a face view of the same. Fig. 13 is an end view of the collar by which the casting shown in Fig. 9 is supported on the frame of the machine. Fig. 14 is a side elevation of the same shown in position on the frame of the machine and also shown in its proper relation to the spreading device shown in Figs. 11 and 12 and to the casting shown in Fig. 9. Fig. 15 is a side elevation of a track and its means of attachment to the frame of the machine for guiding the adjusting-collar shown in Figs. 7 and 8, and Fig. 16 is an end view thereof.

In carrying out my invention I secure the supporting-legs by a suitable pivotal attachment to a slide or sliding collar which is preferably located on the lower diagonal or inclined bar of the frame of the machine and which is provided with means of locking it at any desired adjustment; and to each of these supporting-legs I pivot a spreading and bracing arm, the inner ends of which arms pass through downwardly and outwardly inclined slots in a spreader-plate and are pivotally connected to a collar or other suitable attachment, also secured to the said inclined bar of the frame, whereby the downward movement of the said adjusting-collar will force the free ends of the supporting-legs downward and at the same time force the spreading-arms downward in the outwardly-inclining slots of the spreader-plate, and hence automatically cause them to spread at their forward or outer ends and at the same time spread the supporting-legs.

1 represents the aforesaid inclined bar of the frame to which my support is preferably attached, and 2 is the adjusting collar or slide, which encircles the same and is capable of sliding up and down thereon; but in order that this collar may be held against rotary movement on the bar 1 I provide the under side of the bar 1 with a track or way 3, of any suitable form, and the under side of the collar 2 with a recess 4 of complementary form for receiving the track or way 3, (see Figs. 7, 15, and 16,) whereby the collar may slide longitudinally of the bar 1 but may not rotate thereon. This track or way 3 may be secured to the bar 1 in any suitable manner—such, for instance, as by means of a pair of split collars 5, one at each end of the way 3, and which serve the further function of limiting the movement of the adjusting-collar longitudinally of the bar 1.

The under side of the adjusting-collar 2 is provided with a depending lug 5, which is perforated transversely of the bar 1, as shown at 6, Fig. 8, and to which lug 5 is pivoted the coupling-piece 7, (shown in Fig. 10,) which is provided on its upper side with a pair of perforated ears 8, which embrace the perforated lug 5, and through which and said lug passes a suitable pivot-pin. The under side of this coupling-piece 7 is recessed, as shown in dotted lines in Fig. 10, for the reception of the flattened ends 9 of the supporting-legs 10, which ends 9 are perforated, so that pivot-pins may be passed through them and transverse perforations 11 in the coupling-piece 7 for pivotally connecting the legs 10 thereto in such a manner that the legs 10 will be capable of spreading apart, as shown in Fig. 1. In order that the spreading or lateral movement of the legs 10 may be limited, the coupling-piece 7 is provided on its under side and at each end of the recess therein with a downwardly and outwardly inclining stop 12, against which the legs 10 strike when they arrive at their proper position for supporting the machine. By this means it will be seen that the legs 10 are hinged to the collar 2 on axes extending at right angles to each other, so that the legs may not only be spread apart for supporting the machine but may be folded together and pushed up against the under side of the bar 1 in a position substantially parallel therewith and out of the way when the collar 2 is slid to the upper end of its movement, as shown in dotted lines in Fig. 1. In order that the coupling-piece 7 may lie flat against the under side of the track or way 3 in a compact form, one side of such coupling is notched or recessed, as shown at 13 in Fig. 10, so as to receive the track 3 when the legs 10 are folded up.

14 represents the spreading and bracing arms, which automatically spread the legs 10 apart when the sleeve 2 is lowered and hold them from turning on their transverse hinge in the event the machine should be pushed forward or backward. These arms 14 are each provided at one end with a transverse pivot-pin 15, which passes through a perforated ear 16, swiveled to a collar 17, which latter is located on each of the legs 10 and held against longitudinal movement thereon by an ordinary collar 18, arranged thereunder, and a collar 19, arranged over it. The sleeve 17 is free to rotate on the leg 10; but its rotary movement is limited by a lug or stop 20, formed on the under side of the collar 19 and projecting into a notch 21, formed in the upper end of the collar 17. By this means it will be seen that the collar 17 may rotate upon the leg 10 sufficiently to permit the legs to be folded together, and the pivot-pin 15 may rotate in the ear 16 to permit the legs to be drawn up against the under side of the bar 1, the swiveled ear 16 also contributing to the freedom of movement necessary for folding the legs to a parallel position. The pivot-pins 15 may be held from disengagement from the perforated ears 16 in any suitable manner—such, for instance, as by means of a transverse pin passing through a perforation 22, formed in the pin 15, as will be understood.

Each of the arms 14 is provided at its other end with a flattened portion 23, provided with a perforation 24, which flattened portion is fitted between a pair of perforated ears 25, formed on a coupling-piece 26 (shown in Fig. 9) and having two transverse perforations 27, which coincide, respectively, with the perforations 24 in the ends of the arms 14, whereby a suitable pivot-pin, passing through the perforation 27, hinges each of the arms 14 to the coupling 26. The upper side of this coupling 26 is provided at each end with an ear 27$^a$, which ears embrace a lug 28, formed on the under side of a collar 29, which is secured to the bar 1 of the frame. The lug 28 and the ears 27$^a$ are provided, respectively, with coinciding perforations 30 31, by means of which a suitable pivot-pin connects the coupling 26 to the collar 29, and thus hinges the spreading-arms 14 to the frame of the machine on axes extending at right angles to each other, whereby they may be folded together and then folded up in a compact form against the under side of the bar 1 in the manner shown in dotted lines in Fig. 1.

The device for automatically spreading the arms 14 and holding them in their spread position is clearly shown in Figs. 11, 12, and 14; and it consists, preferably, of an angular plate 32, whose one member or portion 33 is brazed at its lower edge 34 to the upper end of the collar 29, as shown in Fig. 14, so that the other member or angle 35 of the plate 32 will project downwardly, as shown in Fig. 1. This member 35 is provided with two downwardly-diverging slots 36, through which the spreading-arms 14 pass, respectively, and which slots 36 constitute a wedge interposed between said arms. By means of these diverging slots 36 it will be seen that the arms 14 are caused to spread apart at their forward ends when the latter are lowered by the downward movement of the adjusting-collar 2, and when said arms are elevated such slots will cause them to come together. Hence the simple upward-and-downward movement of the adjusting-collar 2 automatically effects the desired adjustment or position of the various parts of the support. When the collar 2 is pushed upward, the arms 14 pull the legs 10 together and up against the under side of the bar 1, the lower ends of the legs 10 being supported in their drawn-up position by the diverging upper edges of the plate 35.

In order that the adjusting-collar 2 may be firmly secured at the desired adjustment, its upper side is provided with a set-screw 37, and in order that the impingement of this screw may not deface the bar 1 the upper edge of the latter is provided with a longitudinal strip 38, which is secured at its ends, respectively, to the collars 5, and upon which strip the screw 37 bears.

Having thus described my invention, what I claim as new, and desire to secure by Letters Patent, is—

1. A support for the purpose described having in combination a slide; means for securing said slide in position; a pair of legs hinged to said slide; a pair of arms flexibly joined at one end to said legs respectively and having a hinge-support at their other end; and a wedge interposed between said arms whereby the movement of said slide will automatically cause said legs and arms to spread apart and will thrust the lower ends of said legs forwardly, substantially as set forth.

2. A support for the purpose described having in combination a slide, the inclined bar 1 of the bicycle to which said slide is secured, means for limiting the movement of said slide, a pair of legs hinged to said slide, a pair of arms having hinge-support at one end, universal joints connecting the other ends of said arms to said legs respectively and a wedge interposed between said arms whereby the movement of the slide will automatically cause said legs and arms to spread apart while thrusting the lower ends of said legs downwardly and forwardly, substantially as set forth.

3. A support for the purpose described having in combination a slide, means for securing said slide in place, means for limiting the movement of said slide, a pair of legs hinged to said slide, a pair of hinged arms flexibly joined to said legs respectively, a plate having outwardly and downwardly diverging slots through which said arms pass and by which said arms are spread apart, the upper edges of said plate being inclined for assisting in supporting the lower ends of said legs when in their drawn-up position, substantially as set forth.

SAMUEL S. BEEBE.

Witnesses:
E. P. PIGGOTT,
EDNA B. JOHNSON.